US011158084B2

(12) United States Patent
Ross et al.

(10) Patent No.: US 11,158,084 B2
(45) Date of Patent: *Oct. 26, 2021

(54) DETERMINATION OF RELATIVE POSITION OF AN APPARATUS

(71) Applicant: Elite Robotics, Camarillo, CA (US)

(72) Inventors: Graham Ross, Oceanside, CA (US); Robert L Kay, Thousand Oaks, CA (US)

(73) Assignee: K2R2 LLC, Camarillo, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 16/183,019

(22) Filed: Nov. 7, 2018

(65) Prior Publication Data

US 2020/0143564 A1    May 7, 2020

(51) Int. Cl.
*B25J 9/16* (2006.01)
*G06T 7/73* (2017.01)

(52) U.S. Cl.
CPC .............. *G06T 7/75* (2017.01); *B25J 9/1692* (2013.01); *B25J 9/1697* (2013.01); *G06T 2207/30244* (2013.01)

(58) Field of Classification Search
USPC ................................................ 382/103, 153
See application file for complete search history.

(56) References Cited

U.S. PATENT DOCUMENTS

| | | | | |
|---|---|---|---|---|
| 6,681,151 | B1* | 1/2004 | Weinzimmer | B25J 9/1697 219/121.85 |
| 7,672,504 | B2* | 3/2010 | Childers | G01S 7/481 382/154 |
| 8,473,131 | B2 | 6/2013 | Leary | |
| 8,718,856 | B2 | 5/2014 | Leary | |
| 9,056,555 | B1 | 6/2015 | Zhou | |
| 9,468,349 | B2* | 10/2016 | Fong | B25J 9/1664 |
| 9,493,087 | B2 | 11/2016 | Leary | |
| 9,566,869 | B1 | 2/2017 | Benson | |
| 9,981,389 | B2* | 5/2018 | Kennedy | B25J 15/08 |
| 10,078,908 | B2* | 9/2018 | Kay | H04N 13/239 |
| 10,106,048 | B2* | 10/2018 | Haddad | B60L 53/37 |

(Continued)

FOREIGN PATENT DOCUMENTS

EP    12005103.2 A1    7/2012

OTHER PUBLICATIONS

Pandey, Rohit, Egocentric 6-DoF Tracking of Small Handheld Objects, arXiv.org, Apr. 16, 2018, arXiv:1804.05870v1 [cs.CV], Cornell University, USA.

(Continued)

*Primary Examiner* — Ishrat I Sherali
(74) *Attorney, Agent, or Firm* — Blue Sky Technical Advisors

(57) ABSTRACT

A workcell that is configured to interact with a device having a plurality of target items and a first memory comprising information about 3D positions of the plurality of target items defined in a first coordinate system of the device. The workcell has a camera module and a processor. The camera module is configured to provide information about a first position of a target item on a first sensor and a second position of the same target item on the second sensor. The processor is configured to determine a position and an orientation of the device within the coordinate system of the workcell.

7 Claims, 9 Drawing Sheets

(56) References Cited

U.S. PATENT DOCUMENTS

| | | | | |
|---|---|---|---|---|
| 10,175,696 | B2* | 1/2019 | Aldred | G05D 1/0234 |
| 10,436,590 | B2* | 10/2019 | Cui | G05D 1/0274 |
| 2007/0064242 | A1* | 3/2007 | Childers | G01S 17/48 |
| | | | | 356/601 |
| 2009/0327165 | A1* | 12/2009 | Kaufman | B60L 53/80 |
| | | | | 705/500 |
| 2014/0354229 | A1* | 12/2014 | Zhao | B60L 53/126 |
| | | | | 320/109 |
| 2015/0097084 | A1* | 4/2015 | Szabo | B64G 1/26 |
| | | | | 244/171.1 |
| 2015/0142171 | A1* | 5/2015 | Li | B25J 9/1692 |
| | | | | 700/251 |
| 2016/0144735 | A1* | 5/2016 | Haddad | B60L 53/665 |
| | | | | 320/109 |
| 2017/0181809 | A1* | 6/2017 | Panescu | G06T 7/33 |
| 2018/0350096 | A1* | 12/2018 | Kay | G06T 7/73 |
| 2019/0050697 | A1* | 2/2019 | Meng | G06K 19/07749 |

OTHER PUBLICATIONS

Zhang, Jiawei, 3D Hand Pose Tracking and Estimation Using Stereo Matching, arXiv.org, Oct. 23, 2016, arXiv:1610.07214v1 [cs.CV], Cornell University, USA.

Miseikis, Justinas, 3D Vision Guided Robotic Charging Station for Electric and Plug-in Hybrid Vehicles, arXiv.org, Mar. 15, 2017, arXiv:1703.05381v1 [cs.RO], Cornell University, USA.

* cited by examiner

DETAIL "A" FROM FIG. 6A

DETERMINATION OF RELATIVE POSITION OF AN APPARATUS

CROSS-REFERENCE TO RELATED APPLICATIONS

This Continuation-In-Part application claims the benefit of U.S. application Ser. No. 16/044,321 filed Jul. 24, 2018 and currently pending, which is a Continuation of U.S. application Ser. No. 15/483,626 filed Apr. 10, 2017 and issued as U.S. Pat. No. 10,078,908, which claims priority to U.S. provisional application No. 62/374,277, filed Aug. 12, 2016.

STATEMENT REGARDING FEDERALLY SPONSORED RESEARCH OR DEVELOPMENT

Not applicable.

BACKGROUND

Field

The present invention generally relates to determination of the position of equipment relative to a robotic system that will interact with the equipment.

Description of the Related Art

Robotic workcells commonly use a robot arm to move items between locations, for example between a transport tray and a processing fixture. In current systems, the locations from which the item is picked up and where the item is to be placed must be known precisely by the controller of the robot arm as the robot moves blindly between positions. Set-up of a workcell therefore requires either precision placement of the fixture relative to the robot arm in predetermined positions or calibration of the system after the robot arm and fixture are in place. In either case, the robot arm and the fixture must remain in their calibrated positions or the workcell will no longer function properly.

Methods of determining the position of an object in space by triangulation are known.

Methods of using two cameras to take pictures of the same scene, find parts that match while shifting the two images with respect to each other, identify the shifted amount, also known as the "disparity," at which objects in the image best match, and use the disparity in conjunction with the optical design to calculate the distance from the cameras to the object are known.

Tracking of a moving object may be improved by use of an active fiducial such as disclosed in U.S. Pat. No. 8,082,064. The sensed position of the fiducial may be used as feedback in a servo control loop to improve the accuracy of positioning a robot arm. Fiducials may be placed on the robot arm and a target object, wherein the sensed positions of the fiducials are used as feedback to continuously guide the arm towards the target object.

SUMMARY

It is desirable for a robotic workcell to autonomously determine the locations and orientations of each item in the workcell and adjust the programming of the robot arm so it can successfully interact with each of the items without operator intervention or a manual calibration of the positions of the modules.

It is further desirable to provide the ability to locate items using passive camera systems and avoid the need for illuminators, scanning lasers, or devices that emit structured light. This improves the simplicity of system, avoid the cost of additional components, and eliminates risks associated with the use of lasers or other emitters around people.

It is desirable to enable a workcell to use a robot module that does not have a fixed or pre-defined location and orientation with respect to a camera module.

It is desirable during set-up to convert information about the position of fiducials, modules, or interaction points that is known in a coordinate system associated with a camera module into a different coordinate system that is associated with a robot module. Once this information is converted to the coordinate system of the robot module, control of the robot arm and interaction of the robot arm with the interaction point can be accomplished without further input from the camera module. In particular, the camera module does not provide continuous information on the position of any object or module.

It is further desirable for a fixture to carry all the necessary information for its use in an autonomous workcell in an embedded memory that can be downloaded automatically by the workcell processor.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

Figure 1:
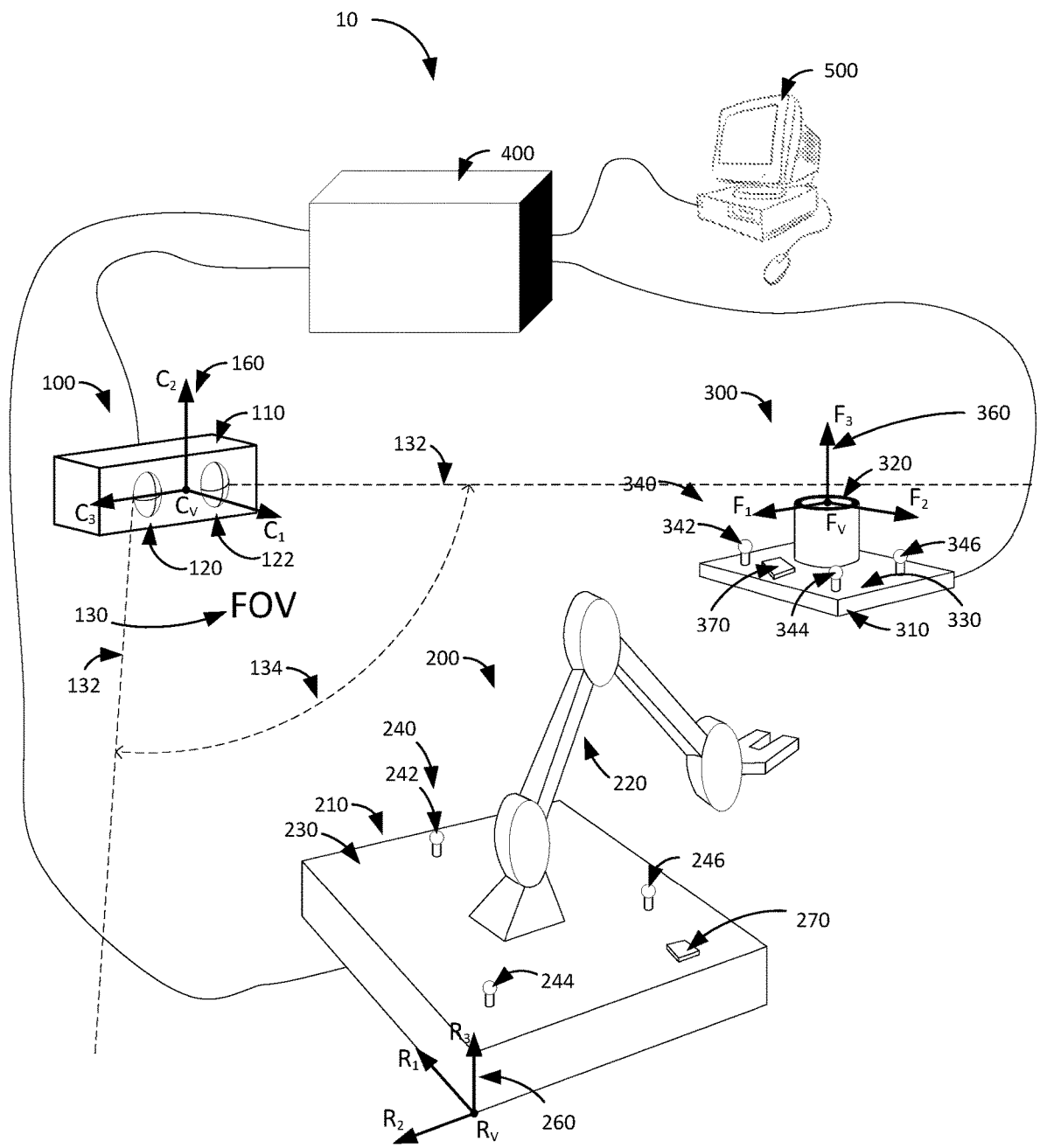
FIG. 1 depicts an exemplary workcell according to certain aspects of the present disclosure.

The following description discloses embodiments of a system and method of identifying the location and orientation of a robot arm, tools, fixtures, and other devices in a workcell or other defined volume of space.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

As used within this disclosure, the term "light" means electromagnetic energy having a wavelength within the range of 10 nanometers to 1 millimeter. In certain embodiments, this range is preferably 300-1100 nanometers. In certain embodiments, this range is preferably 700-1100 nanometers. In certain embodiments, this range is preferably 2-10 micrometers.

As used within this disclosure, the term "fiducial" means a device or assembly that has two states that can be differentiated by observation. In certain embodiments, the fiducial changes color. In certain embodiments, the fiducial exposes a first surface while in a first state and exposed a second surface while in a second state. In certain embodiments, the fiducial emits a first amount of light while in a first state and exposed a second amount of light that is different from the first amount of light while in a second state. In certain embodiments, the fiducial is a light emitter that is "on" in a first state and "off" in a second state. In certain embodiments, the fiducial emits electromagnetic energy at wavelengths within the range of 10 nanometers to 1 millimeter. In certain embodiments, this range is 100 nanometers to 100 micrometers. In certain embodiments, the fiducial emits electromagnetic energy over a defined solid angle.

As used within this disclosure, the term "constant" means a value of a parameter that changes less than an amount that would affect the common function or usage of an object or system associated with the parameter.

As used within this disclosure, the term "alphanumeric" means characters that includes one or more of numeric values 0-9, letters a-z in uppercase or lower case, and the complete set of capitalized and non-capitalized letters in non-English alphabets. This includes binary strings, hexadecimal codes, and any other encoding scheme for information using these characters.

As used within this disclosure, the term "barcode" means an optical, machine-readable, representation of data and includes any structured pattern of graphics that can be observed optically with an imaging device. This includes arrangements of bars of various widths along a straight axis, commonly referred to as linear barcodes, two-dimensional patterns of dots or pixels, commonly referred to a matrix codes, graphic images, and alphanumeric strings of characters.

As used within this disclosure, the term "coupled" means that two items, or a portion of the contents of one or both items, are functionally linked. In particular, a memory is coupled to an item when the memory comprises information regarding the item. The coupled items may be physically proximate or separate. There need not be interaction between the coupled items. The information may be related to a class or type of item and need not be unique to the specific item to which the memory is coupled.

FIG. 1 depicts an exemplary workcell 10 according to certain aspects of the present disclosure. The workcell 10 comprises a camera module 100, a robot arm module 200, a fixture 300, and an electronics module 400. In certain embodiments, a computer 500 or other remote access system is coupled to the electronics module 400 to provide a user interface. In certain embodiments, the workcell 10 may include a work surface or other support structures that have been omitted from FIG. 1 for clarity.

The camera module 100 has a field of view (FOV) 130 bounded by edges 132 and having an included horizontal angle 134. The FOV 130 has a vertical aspect as well that is not shown in FIG. 1 for sake of simplicity. The camera module 100 has a coordinate system 160 with orthogonal axes C1, C2, and C3. The camera module has two optical systems 120, 122 within enclosure 110. Each of the optical systems 120, 122 has a sensor (not visible in FIG. 1) that is positioned such that images of items within the FOV are formed on the sensors. The position on the sensor of the image of an item within the FOV of the optical system is referred to herein as the position of the item on the sensor. Information about the position of an item comprises one of more of a two-dimensional (2D) location of a centroid of the image on the planar surface of the sensor, the maximum intensity of the image, the total energy of the image, the size of the image in one or more of a width, height, or dimension of a shape such as a circle, or other comparative characteristic of images of a target item, for example an illuminated fiducial, on the sensor. A centroid may be determined an intensity-weighted location or the center of an area determined by the intensity exceeding a threshold.

The information about the position of an item on the sensor of the optical system 120 and the position of the same item on the sensor of the optical system 122 is stored as a position data pair in a memory, for example the memory of camera module 100. This information may be just the 2D location of a feature of the image, for example the centroid, or a multi-pixel color image, or other optical derivatives of the image formed on the sensor.

Each sensor has associated electronics that provide an output containing information about the position of a target item on the sensor. Each optical system 120, 122 has its own FOV wherein the FOV of optical system 122 partially overlaps the FOV of optical system 120 and the overlap of the individual FOVs of the two optical systems 120, 122 form the FOV 130 of the camera module. In certain embodiments, the camera module 100 includes one or more of a processor, a memory, signal and power handling circuits, and communication devices (not shown in FIG. 1). In certain embodiments, the memory contains information about the arrangement of the optical systems 120, 122. This information comprises one or more of the distance between the optical axes (not visible in FIG. 1) of the optical systems 120, 122, the angle between the optical axes of the optical systems 120, 122, the position and orientation of the sensors of the optical systems 120, 122 with respect to the respective optical axes and to the coordinate system 160.

The robot arm module 200 has a base 210 with a top surface 230, an arm 220, and a fiducial set 240 comprising at least three fiducials 242, 244, and 246 mounted on the top surface 230. The robot arm module 200 has a coordinate system 260 with orthogonal axes R1, R2, and R3. In certain embodiments, the robot arm module 200 comprises a processor 270 and may additionally comprise a memory, signal and power handling circuits, and communication devices (not shown in FIG. 1) that are coupled to the processor 270. The processor 270 is communicatively coupled to the processor in camera module 100. In certain embodiments, the memory comprises information about the 3D positions of the fiducial set 240 within the coordinate system 260.

The fixture 300 has a base 310 having a top surface 330, a contact element 320, and a fiducial set 340 comprising at least three fiducials 342, 344, and 346 mounted on the top surface 330. The fixture 300 has a coordinate system 360 with orthogonal axes F1, F2, and F3. In certain embodiments, the fixture 300 comprises a processor 370 and may additionally comprise a memory, signal and power handling circuits, and communication devices (not shown in FIG. 1). The processor of the fixture 300 is communicatively coupled to the processor 370 of camera module 100. In certain embodiments, the memory comprises information about the 3D positions of the fiducial set 340 within the coordinate system 360.

A workcell will have a particular function or process to accomplish. In the example workcell 10 of FIG. 1, the robot arm module 200 will manipulate an object (not shown in FIG. 1) and interact with the fixture 300 to perform an operation on the object. This interaction can only be accomplished if the relative position of the point of interaction on the fixture 300 is known to the processor 270 in the coordinate system 260, which would enable the processor 270 to manipulate the robot arm 22 to position the object at the point of interaction on the fixture 300. In conventional systems, this is accomplished by fixing the fixture 300 in position relative to the robot arm module 200 and precisely determining the point of interaction in the coordinate system 260. This is a lengthy and time-consuming calibration process. If the position of either the robot arm module 200 or the fixture 300 are moved even slightly, the calibration process must be repeated.

In an exemplary embodiment, an operator initiates a "determine configuration" operational mode of the workcell after the workcell is reconfigured to perform a new operation. The processor of the electronics module 400 determines what modules are communicatively coupled to it. The camera module 100 is activated to observe the work area of the workcell 10. The processor of the electronics module 400 retrieves information from the memories of the camera module 100, the robot module 200, and the fixture 300. Based on this information, the processor of the electronics module 400 selects a calibration method and manipulates the camera module 100 and the fiducials of the robot module 200 and the fixture 300 to determine the positions of at least a portion of the fiducials of robot module 200 and fixture 300 in the coordinate system 160.

The processor of the electronics module 400 then determines the positions and orientation of the coordinate systems 260, 360 in coordinate system 160, thus providing a capability to transform, or "map," any position defined in either of coordinate systems 260, 360 into an equivalent position defined in coordinate system 260. The interaction points of the fixture 300, which are retrieved from the memory of fixture 300 and defined in coordinate system 360, are mapped into coordinate system 260. The processor 270 of robot module 200 now has all the information that it needs to move the robot arm 200 to any of the interaction points of fixture 300 without further input from the camera module 100.

Once the configuration of the workcell 10 is known, the workcell can be operated in an "operational mode" to process parts. In certain embodiments, the output of camera module 100 is now turned off and, thus, cannot provide continuous feedback on the absolute or relative positions of the robot arm 200 nor fixture 300. In certain embodiments, the camera module 100 may remain active but workcell 10 is operated without updating the 3D position and orientation of the first module with respect to the second module. Only when the position of one of the modules 200, 300 is detected to be changed, for example by sensing movement using an accelerometer coupled to a module, is the information about the position of the fixture 300 in the coordinate system 260 updated.

In certain embodiments, the camera module 100 comprises a binocular arrangement of the optical systems 120, 122 that enables the determination of the position of any single target item, for example fiducial 342, in three-dimensional (3D) space within the FOV 130 and focal range of the camera module 100. The workcell system 10 is configured to unambiguously identify the target item in each of the images formed on the sensors of the optical systems 120, 122, as is discussed in greater detail with respect to FIG. 4A. Once the positions on the sensors of the optical systems 120, 122 of the target item are known, the 3D position of the target item in the coordinate system 160 can be determined through trigonometry and knowledge of the arrangement of the optical systems 120, 122. Information about the arrangement of the optical systems 120, 122 comprises one or more of the distance between the optical axes, a relative angle between the optical axes, the distance between and relative angle of the sensors, the orientation of the optical axes relative to a mounting base of the enclosure 110, and the position and orientation of one or more components of the camera module 100 relative to the center location and orientation of the coordinate system 160.

For the fixture 300, once the positions of at least two of the fiducials in the fiducial set 340 are known, the orientation of an axis passing through these two fiducials can be determined. This is not sufficient, however, to locate the fixture 300 or, more importantly, the point of interaction of the fixture 300 in coordinate system 160. Additional knowledge of the construction of fixture 300, in particular the positions of the fiducials 342, 344, 346 relative to the point of interaction, must be known.

In certain embodiments, the memory of fixture 300 contains information about the 3D positions of the fiducial set 340 defined within the coordinate system 360. In certain embodiments, one of the fiducials of fiducial set 340 is positioned at the center (0,0,0) of the coordinate system 360 and a second fiducial of fiducial set 340 is positioned along one of the axes F1, F2, and F3. In certain embodiments, the center and orientation of the coordinate system are offset in position and angle from the fiducials of fiducial set 340 and the information about the offsets and angles are contained in the memory of fixture 300.

An exemplary method of determining the position and orientation of the coordinate system 360 within the coordinate system 160 starts by determining the positions in coordinate system 160 of at least two fiducials of fiducial set 340, for example fiducials 342, 344. This provides a point location, for example defined by fiducial 342, and a direction vector, for example defined by the vector from fiducial 342 to fiducial 344. Combined with the information about the positions of fiducials 342, 344 in coordinate system 360, the offset position of the center of coordinate system 360 from the center of coordinate system 160 along the axes C1, C2, C3 and the coordinate transformation matrix describing the rotational offset of the coordinate system 360 around the axes C1, C2, C3 can be calculated.

The information about the positions of fiducials 342, 344 in coordinate system 360 is essential to determining the position and orientation of the coordinate system 360 within the coordinate system 160. In the system 10, the electronics module 400 comprises a processor that is coupled to the optical systems 120, 122 and receives information about the positions of the images of the fiducials on the sensor of each optical system 120, 122. The camera module has a memory that contains information about the arrangement of the optical systems 120, 122. The fixture 300 has a memory that contains information about the 3D positions of the fiducial set 340 defined within the coordinate system 360. The processor of the electronics module 400 is communicatively coupled to the memories of the camera module 100 and the fixture 300 and configured to be able to retrieve the information from both the memories. In certain embodiments, this retrieval is triggered when the system 10 is powered on. After information is retrieved from all connected systems, e.g. the camera module 100, the robot module 200, and the fixture 300 in the example system 10 of FIG. 1, the processor of the electronics module 400 initiates a "position determination" process that includes the steps described above for determining the position and orientation, which can also be expressed as a coordinate transform matrix, of the coordinate system 360 within the coordinate system 160.

Determining the 3D position of each fiducial in coordinate system 160 requires the unambiguous determination of the image of the fiducial on the sensor of each of the optical systems 120, 122. An exemplary means of doing so is to configure the fiducial to emit light in a certain range of wavelengths, for example infrared light, and select a sensor that is sensitive to this same range of wavelengths. Filters can be provided in the optical path of the optical systems 120, 122 to block light outside of this range. If a single fiducial is turned on to emit light, which can be considered a "first state," with all other fiducials turned off, which can be considered a "second state," then a single spot will be illuminated on the sensors of optical systems 120, 122.

In certain embodiments, the sensors of optical systems 120, 122 are Position Sensitive Detectors (PSDs) that determine the position of a light spot in the two dimensions of the sensor surface. A PSD determines the position of the centroid of the light spot and its measurement accuracy and resolution is independent of the spot shape and size. The PSD may also provide information related to the maximum brightness of the light spot, the total energy of the bright spot, and one or more aspects of the shape and size of the bright spot. Compared to an imaging detector such as a Charge-Coupled Device (CCD) imager, a PSD has the advantages of fast response, much lower dark current, and lower cost.

In some circumstances, the FOV of camera module 100 may include extraneous sources of light, for example an incandescent light behind the fixture, having a wavelength within the sensitive range of the sensors. An exemplary method of discriminating the fiducial from such extraneous sources is to modulate the frequency of the light emitted by the fiducial. As a PSD is a fast device, modulation frequencies up to around 100 kHz are feasible and therefore avoid the 50/60 Hz frequency of common light sources as well as unmodulated light emitted by sources such as the sun and thermally hot objects. The output signal of the PSD can be passed through a filter, for example a bandpass filter, a hi-pass filter, or a match filter that will block light having frequencies outside of the sensitive range of the sensors.

Another exemplary method of determining the 3D position of multiple fiducials in coordinate system 160 is to selectively cause a portion of the fiducials to move to the first state and cause the rest of the fiducials to move to the second state. For example, at least three fiducials in a common fiducial set are turned on, for example fiducials 342, 344, 346 of fiducial set 340, while turning off all other fiducials on that fiducial set as well as all other fiducial sets in the workcell 10 and using an imaging sensor, for example a CCD imager, to capture a 2D image of the FOV of each optical system 120, 122. The two images will respectively have a plurality of first positions on the first sensor and a plurality of second positions on the second sensor. The images are processed to identify the 3D locations of each fiducial that is turned on. If the relative positions of the fiducials 342, 344, 346 are known, for example in a local coordinate system, a pattern-matching algorithm can determine the orientation and position of the local coordinate system, relative to the observing coordinate system, that is required to produce images of the three fiducials at the sensed locations on the sensors.

These determined locations of fiducials 342, 344, 346 in coordinate system 160 form a 3D pattern that can be matched to a 3D pattern based on the information about the 3D positions of the fiducial set 340 defined within coordinate system 360 that was retrieved from the memory of fixture 300, as the patterns are independent of the coordinate system in which they are defined, provided that the pattern has no symmetry. The result of this matching will be the coordinate transform matrix required to rotate one coordinate system with respect to the other coordinate system so as to match the pattern in coordinate system 160 to the pattern in coordinate system 360.

In certain embodiments, the processor may determine that it is necessary to identify a specific fiducial when multiple fiducials are in the first state. When this occurs, the processor will cause the fiducial to modulate its light in a fashion that can be detected by the sensor. For example, when the sensor is a CCD imager, the fiducial may turn on and off at a rate that is slower than the frame rate of the imager. In another example, where the sensor is a PSD, the processor may synchronize the "on" and "off" states of the fiducial with the reset of the PSD accumulator to maximize difference between "on" and "off" signal strength. Alternately, the fiducial may adjust the intensity of the emitted light between two levels that can be distinguished by the pixel detectors of the CCD sensor. Alternately, the fiducial may adjust the wavelength of the emitted light between two wavelengths that can be distinguished by the pixel detectors of the CCD sensor.

The same methodology used to determine the position and orientation of the coordinate system 360 of the fixture 300 within the coordinate system 160 of the camera module 100 can be then used to determine the position and orientation of the coordinate system 260 of the robot module 200 within the coordinate system 160. The processor of the electronics module 400 retrieves information about the 3D positions of the fiducial set 240 in coordinate system 260 from the memory of the robot module 200. The processor manipulates the fiducials of fiducial set 240 in order to determine the location of each fiducial in the coordinate system 160. The processor then uses the information about the 3D positions of the fiducial set 240 in coordinate system 260 to determine the coordinate transform matrix relating coordinate system 360 to coordinate system 160.

Once the coordinate transformation matrices relating each of the coordinate systems 260 and 360 to coordinate system 160 are determined, it is straightforward to create a coordinate transform matrix that maps positions in the coordinate system 360 of the fixture 300 into the coordinate system 260 of the robot module 200. Any point of interaction with the fixture, for example the location of a receptacle configured to receive a part to be processed, that is included in the information contained in the memory of fixture 300 can be retrieved and converted into coordinate system 260. This data can then be used by the processor that controls the robot arm 220 to place an object in that location.

While the exemplary system 10 described herein associates certain methods and activities with processors of specific modules, the interconnection of the modules enables any function or algorithm to be executed by any processor in the system 10. For example, a portion of the processing of the output of the sensors of optical systems 120, 122 may be performed by a processor within the optical systems 120, 122 themselves, or by a separate processor contained in the enclosure 110 of the camera module 100, or by a processor in the electronics module 400.

The autonomous determination of relative positions of modules greatly simplifies the set-up of a new configuration of workcell 10. An operator simply places the robot module 200 and one or more fixtures 300 within the FOV of camera module 100 and initiates the position determination process. Information about the 3D positions of the fiducial set of each module, defined within the coordinate system of the respective module, is retrieved from the memories of each module. The fiducials are manipulated into various combinations of first and second states, e.g. "on" and "off," and the outputs of the sensors are used to determine the 3D positions of the fiducials in the coordinate system 160. These 3D positions are then used in conjunction with the information about the 3D positions of the fiducials within the various coordinate systems of the modules 300 to map specific locations on the fixtures into the coordinate system of the robot module 200. When this process is complete, the workcell 10 notifies the operator that it is ready for operation.

In certain embodiments, one or more of the modules 200, 300 comprises an accelerometer configured to detect translational or rotational movement of the respective module. For example, motion of a module may be induced by vibration of the work surface or the module during operation, contact between the robot arm 122 and the fixture 300, or an operator bumping into one of the modules. If a module moves, the workcell 10 will stop processing and repeat the position determination process to update the locations on the fixtures within the coordinate system of the robot module 200. In most circumstances, the workcell does not need to physically reset or return to a home position during the position determination process. The robot arm 220 simply stops moving while the position determination process is executed and then resumes operation upon completion.

In certain embodiments, workcell 10 is positioned on a flat work surface (not visible in FIG. 1) that constrains the possible orientations of the various modules relative to the camera module 100. In certain embodiments, it is sufficient to have only two fiducials on a module visible by the optical systems 120, 122.

In certain embodiments, there are 3 or more fiducials in the fiducial set of a module and the processor that is manipulating the fiducials and accepting the information about the positions of the fiducial images from the optical systems 120, 122 is configured to utilize only fiducials that create images on the sensors, i.e. not use fiducials that are hidden from the optical systems 120, 122. As long as a minimum number of the fiducials in the fiducial set are visible to the optical systems 120, 122, the position determination process will be successful. If it is not possible to obtain 3D position information from enough fiducials to determine the position of a module within coordinate system 160, the workcell 10 will notify the operator. In certain embodiments, the modules are configured to detect whether a fiducial is drawing current or emitting light and when a fiducial is not able to move to the first state, e.g. does not turn on, notify the operator of this failure.

In certain embodiments, the camera module comprises multiple intensity detectors that each have an output related to the total energy received over the FOV of that detector. Modulation of a fiducial between "on" and "off" states, and determination of the difference in the total received energy when the fiducial is on and off provides a measure of the energy received from that fiducial. The processor of the electronics module 400 calculates a distance from the camera module 100 to the fiducial based on the ratio of the received energy to the emitted energy and solid geometry. This creates a spherical surface centered at the entrance aperture of the intensity detector. In certain embodiments, the energy emitted by the fiducial and the geometry of the emitted light is part of the information contained in the memory of the module of the fiducial and downloaded with the 3D position information. With three intensity detectors each providing a sphere of possible locations of the fiducial, intersection of the three spheres specifies a point within 3D space where the fiducial is located.

Figure 2A:
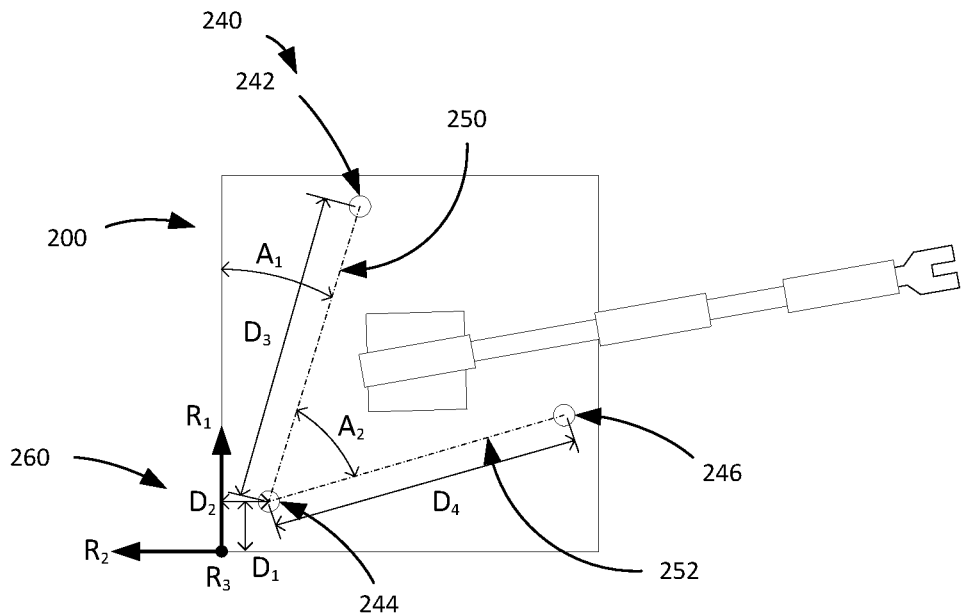
FIGS. 2A-2B depict plan views of the robot module from the workcell of FIG. 1 according to certain aspects of the present disclosure.
Figure 2B:
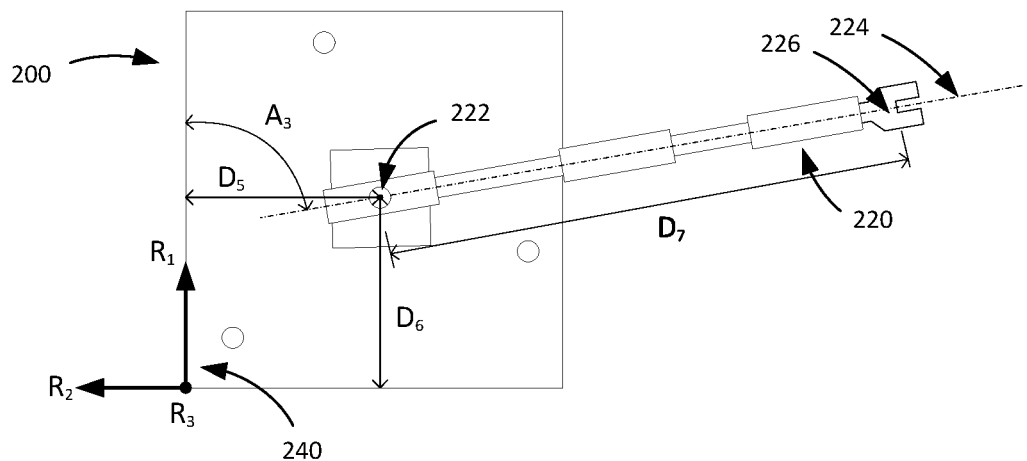

FIGS. 2A-2B depict plan views of the robot module 200 from the workcell of FIG. 1 according to certain aspects of the present disclosure. In this embodiment, fiducial 244 is offset from the origin of coordinate system 240 by distance D1 in the R1 direction and distance D2 in the R2 direction. Fiducial 242 is offset from fiducial 244 by a distance D3 along vector 250 at an angle A1 from axis R1. Fiducial 246 is offset from fiducial 244 by a distance D3 along vector 252 at an angle (A1+A2) from axis R1. The relative position of the fiducials 242, 244, 246 to the origin of coordinate system 260 may be defined in other ways, for example a direct vector from the origin to the fiducial (not shown in FIG. 2A), and the length and angle of that vector. From this information, combined with the positions of some of fiducial set 240 in the coordinate system 160 of the camera module 100, it is possible to determine the position of the origin of coordinate system 260 in coordinate system 160 as well as the directional vectors in coordinate system 160 that are equivalent to directions R1, R2, R3.

FIG. 2B depicts the configuration parameters associated with the robot arm 220 defined in the coordinate system 260. In the embodiment, the robot arm 220 has a first degree of freedom around axis 222, which is parallel to coordinate direction R3. The position of axis 222 is defined by distances D5 and D6 in the R2 and R1 directions, respectively. The angular position of the robot arm 220 is defined an axis 224 that is aligned with the segments of the robot arm 220 and rotated to an angle A3 with respect to direction R1. The position of the gripper 226 with respect to the axis 222 is defined by the distance D7 along axis 224. This information, in conjunction with the knowledge of the position of the origin of coordinate system 260 and the directional vectors that are equivalent to directions R1, R2, R3 of coordinate system 260 in coordinate system 160, enables the position and angle of the gripper 226 to be determined in coordinate system 160. Conversely, any position known in coordinate system 160 can be computed with reference to axis 222 and angle A3.

The benefit of transferring the position of a fixture 300, and points of interaction of fixture 300, into the coordinate system 260 of robot module 200 is to provide the processor 270 with information that enables the processor 270 to move the gripper 226 to the point of interaction of fixture 300. Accomplishing this position determination of the point of interaction of fixture 300 in coordinate system 260 through the use of a an automatic system and process enables the system 10 to function without the modules 200, 300 being fixed to a common structure, thus speeding and simplifying the set-up of the system 10. Once the position of the fixture 300 is known in the coordinate system 260 of the robot module, and the transfer of the additional information regarding the points of interaction of the fixture 300 to the processor 270 and the transformation of the positions of the points of interaction into the coordinate system 260 is completed, the system is ready for operation without a need for the operator to teach or calibrate the system. This is discussed in greater detail with regard to FIGS. 5A-5B.

Figure 3:
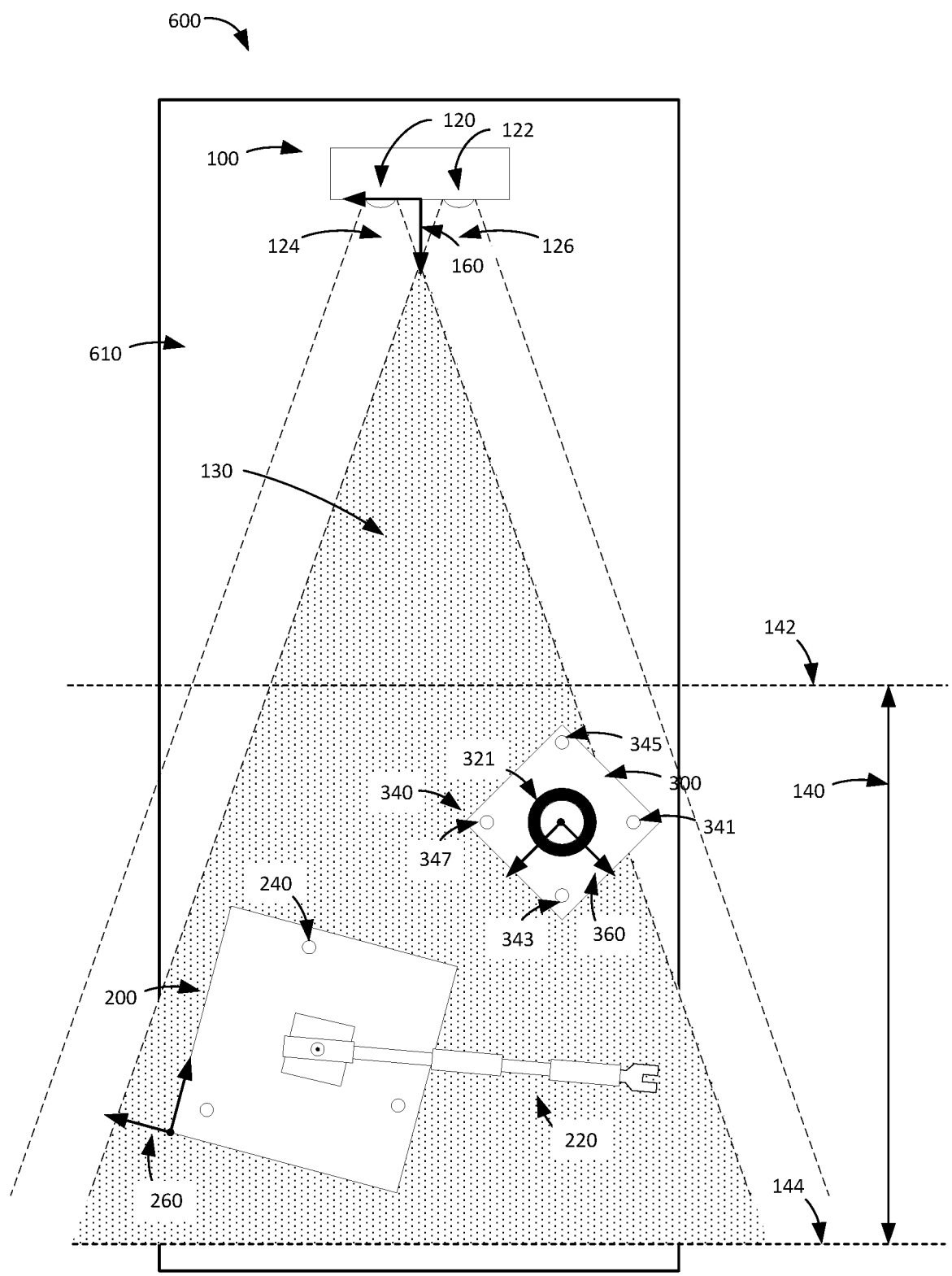
FIG. 3 depicts a plan view of a portion of a workcell according to certain aspects of the present disclosure.

FIG. 3 depicts a plan view of a portion of a workcell 600 according to certain aspects of the present disclosure. The camera module 100, robot module 200, and fixture 300 are positioned on a flat horizontal surface 610. Optical system 120 has a FOV 124 that is delimited by the dashed lines emanating from the curved lens of optical system 120. Optical system 122 has a FOV 126 that is delimited by the dashed lines emanating from the curved lens of optical system 122. The effective FOV 130 is indicated by the shaded region where the FOVs 124, 126 overlap. The work area of the workcell 600 is further defined by the focal range 140 of the optical systems 120, 122, delimited by the minimum focal distance 142 and maximum focal distance 144 from the camera module 100. In certain embodiments, the distances 142, 144 are defined from the center of coordinate system 160. In certain embodiments, the distance 144 may effectively be infinitely far from the camera module 100.

When an operator positions the modules 200, 300 within the FOV 130, one of the fiducials may be outside the FOV. In FIG. 3, fiducial 341 of fiducial set 340 on fixture 300 is outside the shaded area of FOV 130. In addition, fiducial 343 is not visible by optical system 122, being hidden behind the post 321. As long as two fiducials, in this example fiducials 345, 347, are visible to both optical systems 120, 122 then the position of fixture 300 can be determined.

Figure 4A:
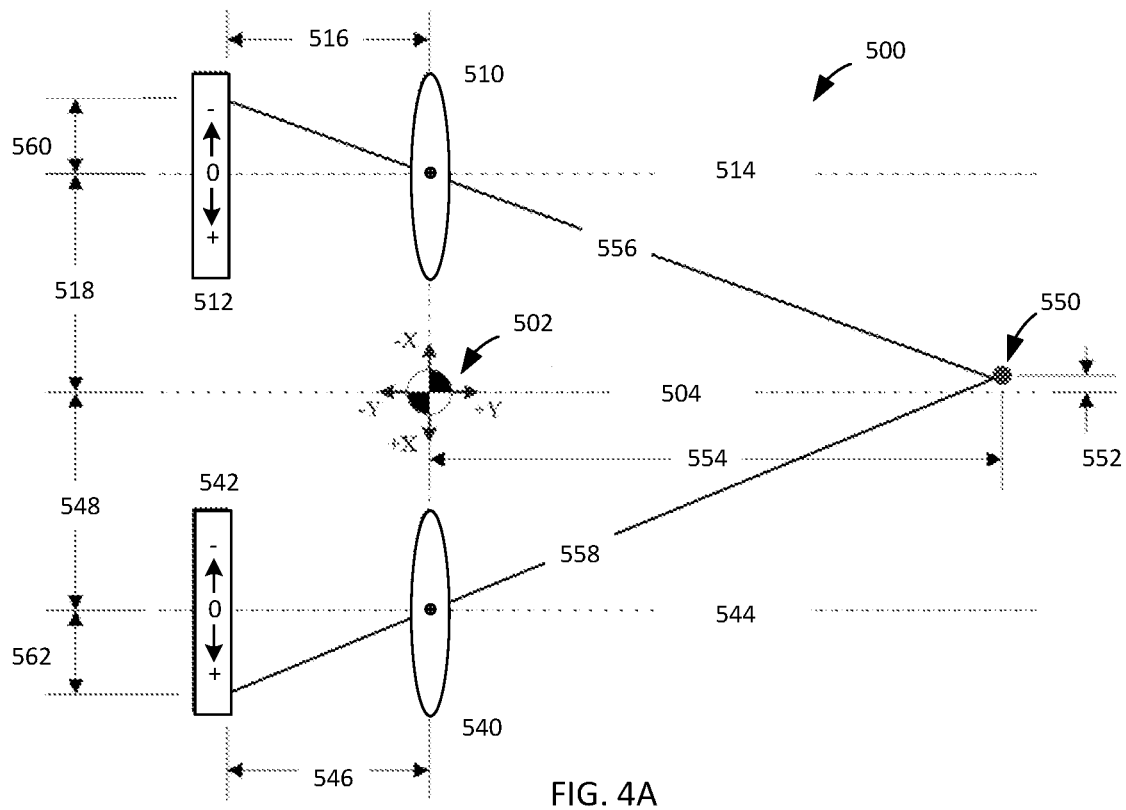
FIGS. 4A-4B depict two exemplary optical designs according to certain aspects of the present disclosure.

FIG. 4A depicts an exemplary optical design according to certain aspects of the present disclosure. In the example binocular system 500, a lens 510 and a sensor 512 are arranged with their centers positioned on an optical axis (OA) 514 and separated by a distance 516 between the sensitive surface of the sensor 512 and the center of the lens 510. Sensor 512 has a polarity indicated by the "+" and "−" signs as to the polarity of the output when a light spot is formed on the upper or lower portions (in this 2D view) of the sensor 512. The set of lens 510 and sensor 520 may be considered as an optical system. This optical system may contain other optical elements, for example additional lenses, reflectors, baffles, stops, and filters, without departing from the concepts disclosed herein. The system 500 also has a second optical system comprising lens 540 and sensor 542 arranged on OA 544 and separated by distance 546. Note that the sensors 512 and 542 have their polarities aligned in the same direction. The system 500 has a center 502 with reference axes Y+, Y−, X+, and X−. In certain embodiments, this center and reference axes correspond to the coordinate system 160 of camera module 100. A system OA 504 passes through the center 502, with the OA 514 separated from the system axis 504 by distance 518 and the OA 544 separated from the system axis 504 by distance 548. All OAs 504, 514, are 544 are parallel and coplanar. When referring to positions, angles, centers, and other aspects of the sensors 512, 542 and similar, it is understood that this is equivalent to the respective aspects of the sensitive surface of the sensor. For example, a center of the sensor is equivalent to the center of the sensitive surface of that same sensor.

A target item 550, for example a fiducial, is positioned within the work area of system 500. Exemplary rays 556 and 558 of light emanate from the target item 550 and respectively pass through the centers of lenses 510, 540 until the ray 556 strikes the sensitive surface of sensor 512 at a distance 560 in the negative direction from the OA 514. The lens 510 and sensor 512 are arranged as a focusing system with a focal range that encompasses the position of target item 550, and therefore other rays emanating from the same point on target item 550 that pass through lens 510 will be refracted onto the same point of impact on the sensor 512. Ray 558 strikes the sensitive surface of sensor 542 at a distance 562 in the positive direction from the OA 544.

In system 500, the absolute values of distances 560, 562 are different by an amount that is proportional to the offset distance 552 of the target item 550 from the system axis 504 but both are still near or at the limits of the sensitive region of sensors 512, 542. As a result, distance 554 is the minimum distance at which a target item is visible in both optical systems and then only when on the system OA 504. Moving the target item further away from the axis 504 will reduce the distance 560 but increase the distance 562 and ray 558 will quickly move off sensor 542 as distance 552 increases. This results in significant portions of the sensors 512, 542 being un-useable and a consequent reduction in the work area of system 500.

Figure 4B:
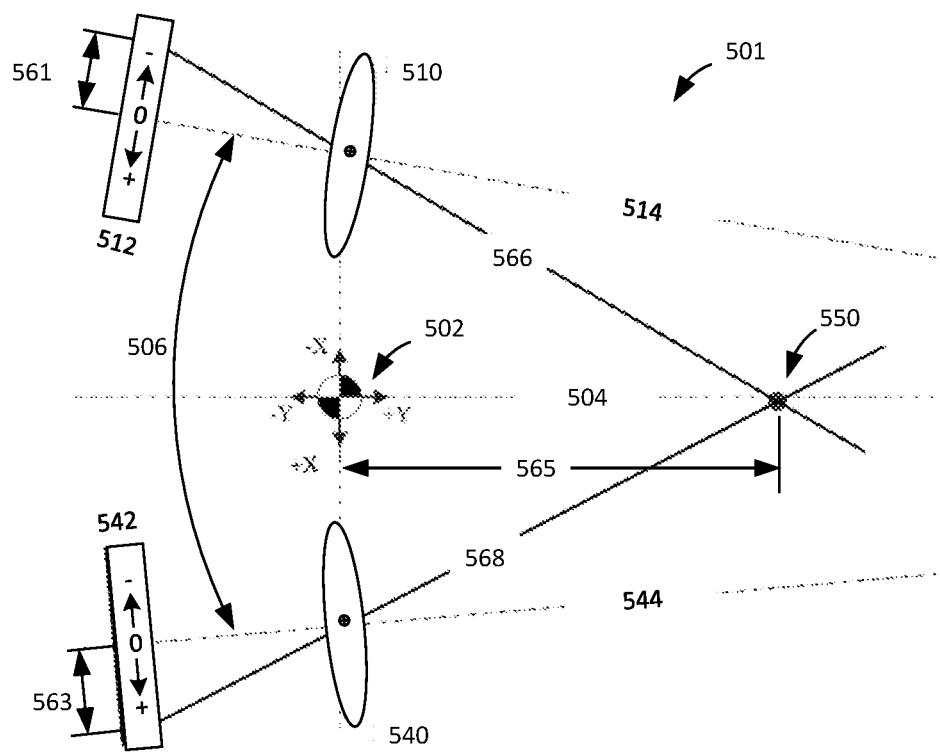

FIG. 4B depicts another exemplary optical design according to certain aspects of the present disclosure. Binocular system 501 is a modification of system 500, wherein the OAs 514, 544 are each rotated toward the system axis 504 and are not parallel to each other. In certain embodiments, the included angle 506 between the two OAs 514, 544 is greater than zero and less than 180 degrees. In certain embodiments, the included angle 506 between the two OAs 514, 544 is in the range of 5-15 degrees. This is contrary to the design rules for optical systems designed for use by humans as the human eye and brain are wired to properly form merged images only when the OAs 514, 544 are parallel. In this example, distances 561, 563 are equal as the target item 550 is now on the system axis 504 and are approximately equal to distance 562 of FIG. 4A, which was the larger of the distances 560, 562. In system 501, the distance 565 from the center 502 to the target item 550 is shorter than distance 554 of system 500, thereby bringing the work area closet to the camera module 100. In certain embodiments, the two OAs 514, 544 pass through the center of the sensitive areas of the respective sensors 512, 542, the sensitive surfaces of which are perpendicular to the OAs 514, 544. As a result, the sensitive surface of sensor 542 is not parallel to the sensitive surface of sensor 512.

The angled OAs 514, 544 increase the total size of the work and make use of a larger portion of the sensitive surfaces of sensors 512, 542. In certain embodiments, the amounts that the axes 514, 544 are rotated toward the system axis 504 are not equal.

Figure 4C:
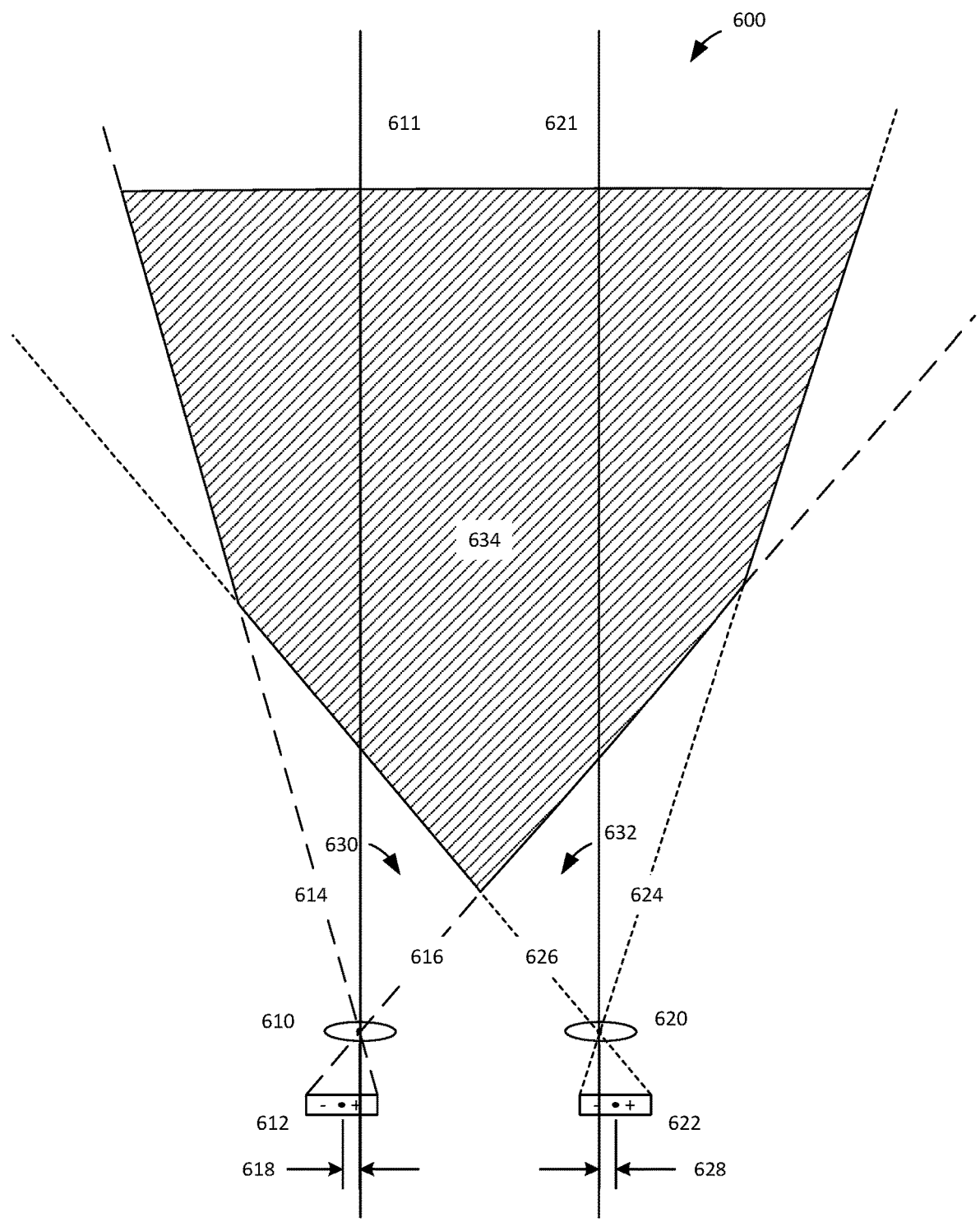
FIG. 4C depicts a third exemplary optical design according to certain aspects of the present disclosure.

FIG. 4C depicts a third exemplary optical design according to certain aspects of the present disclosure. In system 600, the sensors 618, 628 are offset outward by distances 618, 628, respectively, from the OAs 611, 621 that pass through the centers of lenses 610, 620. In certain embodiments, the sensitive surfaces of sensors 612, 622 are parallel. In certain embodiments, the sensitive surfaces of sensors 612, 622 are coplanar. The lines 614, 616 define the paths of rays that will strike the outer edges of sensor 612 and therefore define FOV 630. Similarly, lines 624, 626 define the paths of rays that will strike the outer edges of sensor 622 and therefore define FOV 632. The area of overlap of FOVs 630, 632 define the working area 634 of system 600. The area 634 is wider in the front, i.e. the edge towards the sensors 618, 628, and closer to the sensors 618, 628 than the equivalent area of system 500, i.e. without the offset of sensors 618, 628. The shape of work area 634 is much more useful than the triangular work area 130 of FIG. 3. Although there is a loss of coverage of the outer, rear corners of work area 634, this is generally not useful space in workcells.

Figure 5A:
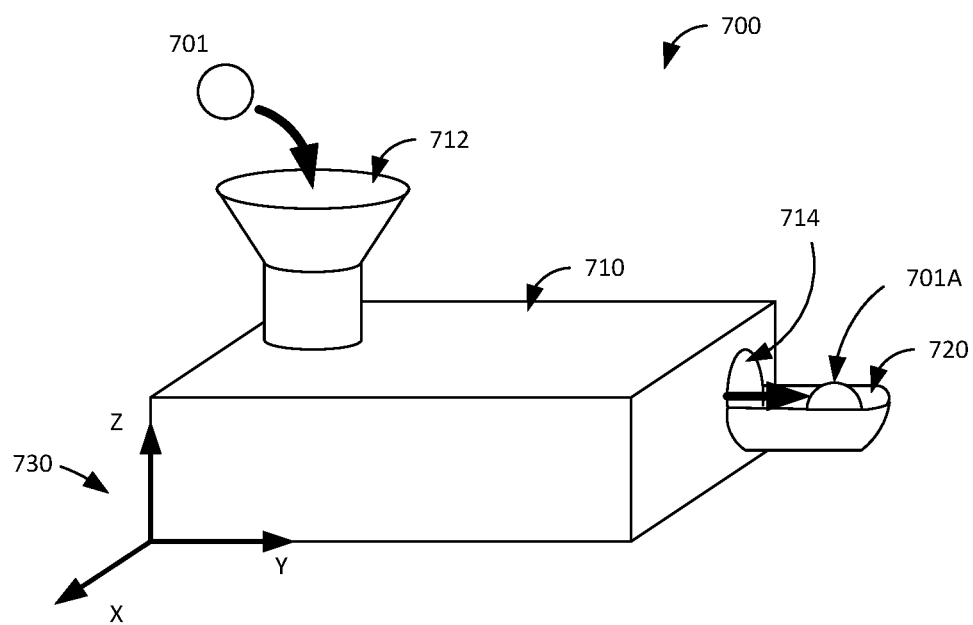
FIGS. 5A-5B depict an exemplary fixture and its associated spatial envelope according to certain aspects of the present disclosure.
Figure 5B:
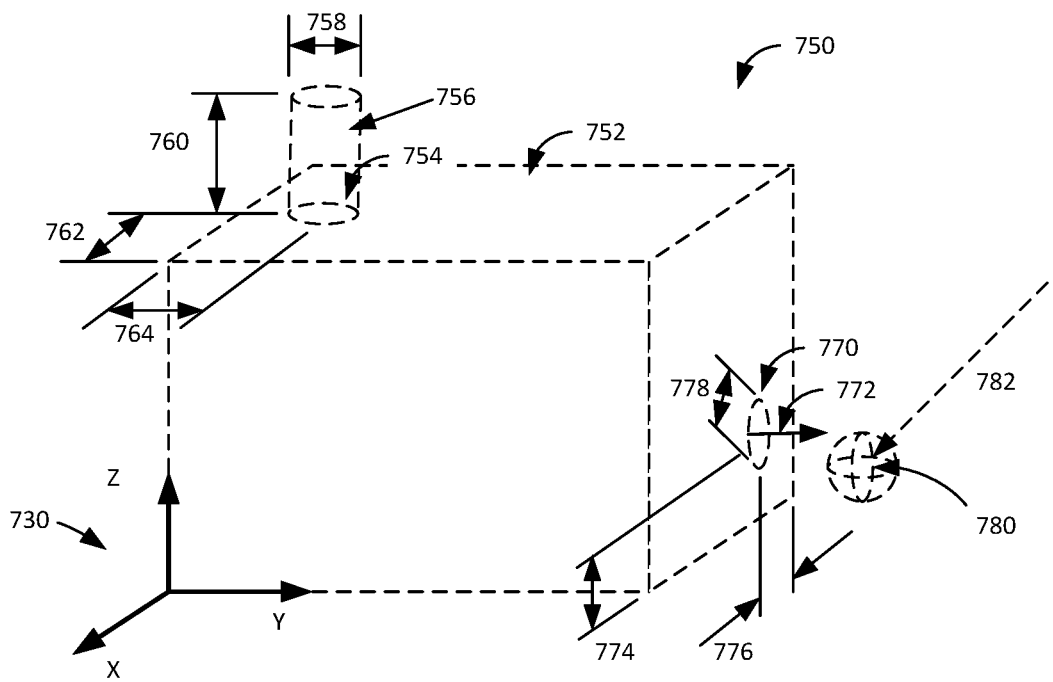

FIGS. 5A-5B depict an exemplary fixture 700 and its associated spatial envelope 750 according to certain aspects of the present disclosure. Fixture 700 is a simplistic device, where a ball 701 is dropped into a funnel 712, passes into the body 710 of the fixture 700 and is processed in some fashion, then exits through aperture 714 into a trough 720 and stops in position 701A. A coordinate system 730 with three orthogonal axes X, Y, Z is defined for the fixture 700. In certain embodiments, coordinate system 730 is also used to define the 3D positions of fiducials (not shown in FIG. 5A). If this fixture 700 were part of a robotic workcell, it would be desirable to have the robot drop the balls 701 into the funnel 712 and then remove the processed balls from location 701A.

FIG. 5B depicts a spatial envelop 750 that is defined to genericize the interface of fixtures to a robot module, such as the robot module 200 of FIG. 1. First, a "keep-out" zone is defined in coordinate system 730 that encompasses the fixture 700. This serves dual purposes, in that acceptance of a fixture may include a comparison to this envelope 752, which would be provided to the fixture supplier in the procurement specifications, to ensure that the fixture is as designed. Secondly, the processor that is controlling a robot arm, for example the robot arm 220 of FIG. 1, can compare the position of the end effector or other points on the arm to the volume of the keep-out zone and adjust the robot arm position and path to avoid entering the keep-out zone. The coordinates of the corners of the keep-out zone are defined in the coordinate system 730 and are included in the information stored in the memory of fixture 700. The keep-out zone need not be a rectilinear solid and may have any form and include curves, protrusions, and cavities. These coordinates and characteristics of the keep-out zone may be downloaded, for example by the processor of electronics module 400 of FIG. 1, and passed to the processor controlling the robot arm 220.

The example envelope 750 also defines interaction points, e.g. an "input location" and an "output location" on the surface of the keep-out zones, as guidance for use of the fixture 700, for example by robot module 200. In this example, the input location is defined in two exemplary ways. First, a circular opening 754 is defined on the surface of the keep-out zone where the robot arm is to place an unprocessed ball 701. The planar input location 754 is defined by location references 762, 764 to the coordinate system 730 and diameter 758. In some embodiments, the input location is defined as a volume 756, wherein the robot arm is to place the ball 701 at any point within this volume 756 and then release the ball 701. The volume 756 is defined by location references 762, 764 to the coordinate system 730 as well as the height 760 and diameter 758 of the volume 756.

The output location is also shown in two exemplary ways. First, a circular exit 770 is defined on the surface of the keep-out zone 752 and located by locations references 774, 776 and diameter 778. An exit vector 772 is also defined to indicate the direction of motion of the ball 701 when it passes through the exit 770. A second example of defining an output location is the final location 780, which indicates the position 701A from FIG. 5A where the ball 701 will come to a stop. In some embodiments, an approach vector 782 is defined to indicate from what direction the end effector should approach the location 780. The information about the characteristics of the input and output locations is also included in the information stored in the memory of fixture 700 and may be downloaded with the other information.

Other types of interaction points may be defined as appropriate for the purpose of the workcell and types of parts to be handled in the workcell. For example, multiple holding locations may be defined on a tray, each location designated as an interaction point. Interaction points may depend on the status or content of a module, for example a tray may have a first set of interaction points for a first layer of parts that rest directly on the tray and a second set of interaction points for a second layer of parts that is stacked upon the first layer of parts and are only usable when the first layer of parts is in place. A tool may have loading and unloading interaction points, or a single interaction point that is both a loading and unloading location.

Defining the keep-out zone and input and output locations and vectors enables this information to be downloaded from the fixture 700 to a processor in the workcell that controls the robot arm so as to automate the programming of the robot arm to interact with fixture 700. The information contained in the memory of fixture 700 comprises the 3D location of the fiducials, the characteristics of the keep-out zone, and the characteristics of the input and output locations and approach vectors as well as other information such as a fixture model, serial number, dates of manufacture or latest service, or any other fixture-related data. In certain embodiments, this information is stored in a defined data structure that is common to all fixtures. In certain embodiments, the information is provided as data pairs, the first data item being a data identifier for a particular parameter and the second data item being the value or values of that parameter. In certain embodiments, data may be stored according to any style of storage that enables retrieval and identification of the data elements in the memory.

One of the advantages of providing information about the fixture in this generic way is that generic commands are sufficient to instruct the robot on how to interact with the fixture. For example, a command "place item in input location" is enough, when combined with the information from the fixture that defines the location of the fixture relative to the robot arm, the position of the input location, and the vector to be use to approach the input location, to cause the robot to place the item (which it presumably picked up in a previous step) in the desired input location of the fixture. This simplifies the programming and avoids having to program the workcell as to the precise location of the input location for this set-up.

In some embodiments, the characteristics of a single type of fixture are stored as data set in a library that is available, for example, to the processor of electronics module 400. This library may be resident in the memory of electronics module 400, in the memory of robot module 200, on a remote memory accessible by the processor of electronics module 400 over a network, or in any other storage location or medium where information can be stored and retrieved. Each data set will have a unique identifier that is also stored in the memories of modules of that type of fixture. The processor need only retrieve the identifier from a fixture, and retrieve the data set associated with that type of fixture from the library. Retrieval of the identifier may be by scanning a machine-readable code such as a barcode, observing a machine-readable code by one of the optical systems of camera module 100 and parsing that portion of the image, scanning a Radio Frequency Identification (RFID) device, or through interaction with a processor or other electronic device over a wired or wireless communication link. In some embodiments, the library is available on a central server, for example a cloud-based data server, to which the processor can be communicatively coupled. In certain embodiments, the library is downloaded to a memory of the electronics module 400 and periodically updated as new fixtures are released. In certain embodiments, the library is stored on the computer 500 of FIG. 1.

A module 700 may have only output locations. For example, a tray of parts may be provided to the workcell. In some embodiments, the tray may have a barcode label printed in a location visible to the camera module 100. The memory of the electronics module 400 may include information about the size, shape, fiducial locations, and interaction points of the tray. After the position of the tray is determined by the system 10 and the information regarding access points and locations is transferred to the processor 270, the processor 270 can then direct the robot arm 220 to remove parts from the tray. When the tray is empty, as will be known by the processor 270 after it has interacted with each of the interaction points of the tray, e.g. removed a part from each of the interaction points, the workcell 10 can signal for a new tray of parts to be provided, for example by sending a signal to another system to remove the empty tray and provide a new tray with parts.

Figure 6A:
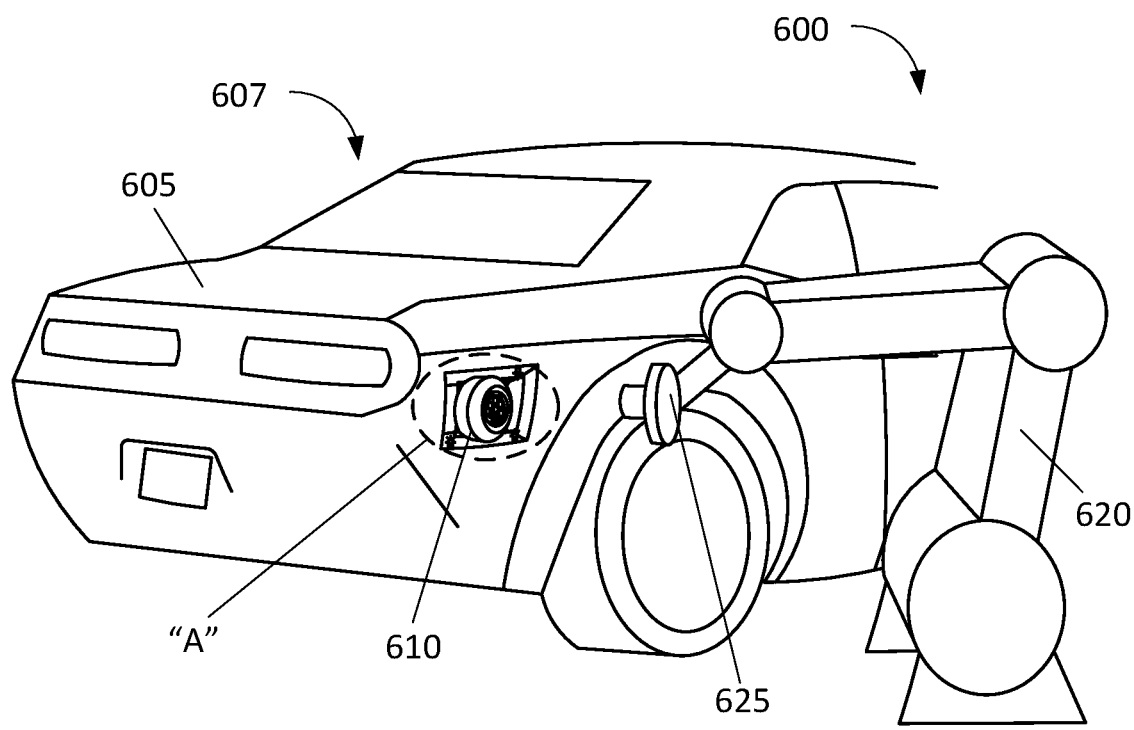
FIGS. 6A-6B depict an exemplary vehicle charging workcell according to certain aspects of the present disclosure.

FIG. 6A depicts an exemplary vehicle charging workcell 600 according to certain aspects of the present disclosure. The workcell 600 comprises a robot arm 620 having an end effector 625 adapted to connect a charging cable (not visible in FIG. 6A) to the charging port 610 of an example vehicle 607 and the volume of space accessible by the end effector 625. A piece of equipment, in this example the car 607, can be interacted with by the robot arm 620 & end effector 625, e.g. refueled, within the workcell 600. This same concept of robotic servicing can be applied to any piece of equipment or mobile device, for example trucks, golf carts, aircraft, remotely piloted vehicles, or mobile robots and to replenishment of liquid fuel using a hose and dispensing tip in place of a charging cable and connector, to replenishment of solid fuel such as hydrogen-absorbing pellets using a suitable transfer system, and to replenishment of gaseous fuel such as propane or hydrogen using a gas-transfer hose and dispensing tip.

The vehicle 607 inherently has a base, for example the body 605 of the car 607, that serves as the stable platform for attachment of accessories and features such as the charging port 610. The position of a point of interaction, such as the charging port 610, is defined within a coordinate system that is fixed relative to the body 605.

Figure 6B:
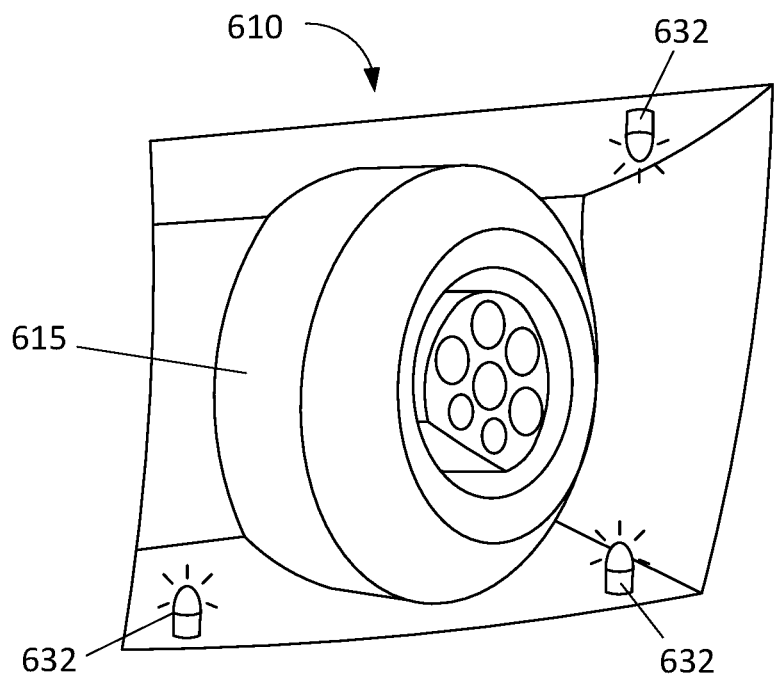

FIG. 6B is an enlarged view of a portion of FIG. 6A as indicated by the dashed oval labeled "A" in FIG. 6A, according to certain aspects of the present disclosure. Within the charging port 610 is a connector 615 and a plurality of target items 632 coupled to the body 605. In this example, the target items 632 are light-emitting fiducials positioned around the connector 615. Each target item 632 has a 3D position defined in the coordinate system of the body 605.

Associated with the vehicle 607, there exists a memory (not visible in FIGS. 6A & 6B) that is coupled to the body 605 and comprising information about the 3D positions of the target items as defined within the coordinate system of the body 605. Information related to the vehicle 607, including the 3D positions of a portion of the plurality of target items 632 within the coordinate system of the body 605, is stored in the memory and may be retrieved from the memory using an identifier that is associated with the vehicle 607. In certain embodiments, the vehicle 607 also comprises a communication module (not visible in FIG. 6A) that is coupled to the memory and configured to retrieve a portion of the information from the memory and provide the retrieved portion of the information to an external device, for example a processor of the robot arm 620. In certain embodiments, the communication module comprises a processor or is coupled to a separate processor that is also part of the vehicle 607. In certain embodiments, the memory is remote from the body 607 and the communication module comprises the identifier and is configured to provide the identifier to an external device, which can then use the identifier to retrieve information from the memory.

In certain embodiments, this identifier is a barcode or other machine-readable visual marking (not shown in FIGS. 6A & 6B) on the vehicle 607 or an alphanumeric string electronically transferred via active transmission or passive modulation by a circuit, e.g. a Radio Frequency Identification (RFID) device or tag. In certain embodiments, the barcode is the barcode is provided on a surface of the vehicle 607, for example an interior surface within the charging port 610. This type of identifier is sometimes referred to as a "license plate" as it functions much in the same way that a license plate number of a registered motor vehicle may be used to retrieve information about the vehicle, for example the owner's name and the vehicle make and model, from a database, i.e. a memory, remotely located at a facility of the Department of Motor Vehicles (DMV) or equivalent organization. In this case, information about the 3D positions of the plurality of fiducials 632 within the coordinate system of the car 607 can be retrieved from the memory using the identifier. The identifier may alternatively be transferred by a plug-in cable, modulation of the light emitted by the fiducials, Bluetooth, wifi, or proprietary communication scheme.

In certain embodiments, the memory is part of the vehicle 607 and the information is provided directly from the car 607 to the charging workcell 600 without explicit use of an identifier.

In more general terms, the workcell 600 can be any space having an articulated element and configured to receive a piece of equipment in a variable position and orientation, relative to the coordinate system of the workcell 600, and manipulate the piece of equipment in some manner. In certain embodiments, the workcell 600 is a landing platform for a flying drone where the drone could be loaded or unloaded or refueled or have a battery swapped.

Figure 7:
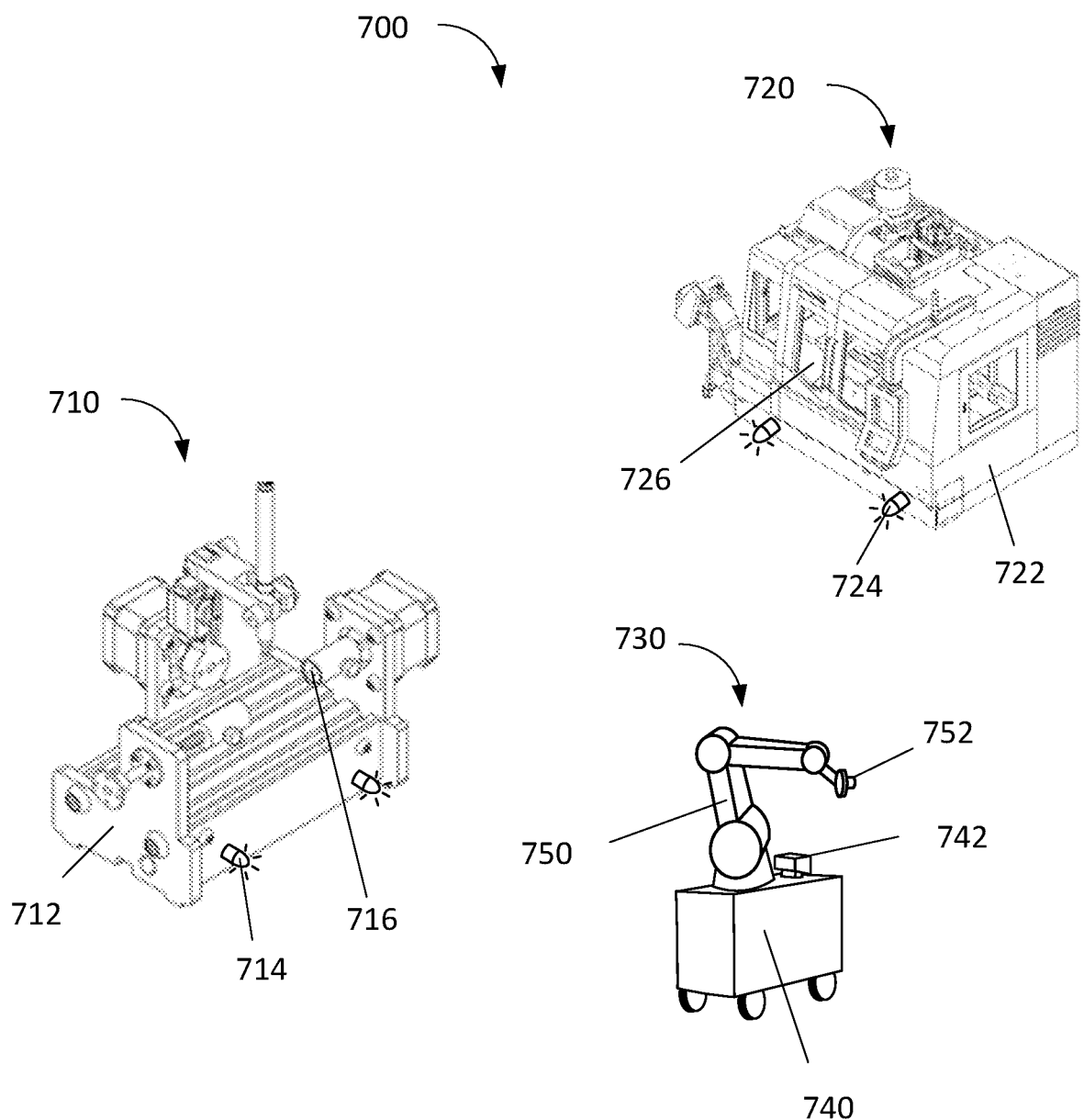
FIG. 7 depicts an exemplary virtual workcell according to certain aspects of the present disclosure.

FIG. 7 depicts an exemplary virtual workcell 700 according to certain aspects of the present disclosure. The workcell 700 is defined by the volume of space accessible by the range of motion of the end effector 752 as mounted on the robot arm 750 and within the range of travel of the mobile cart 740. In certain embodiments, the mobile cart 740 is replaced by a rail-mounted or gantry-mounted body (not shown in FIG. 7). In this example, there are two machines 710, 720 positioned within the workcell 700. The machines 710, 720 perform sequential operations upon a part (not visible in FIG. 7) that must be transferred from machine 710 to machine 720 as part of the operational process. The need to transfer a part from a first location to a second location is common to many other types of operations, including loading and unloading trays or other packaging, dispensing an item from a stock of items, removal of a depleted battery from a vehicle and installation of a replacement battery in the same vehicle, and removal of a cargo item from a vehicle or placement of a cargo item in a vehicle.

The first machine 710 has a body 712, in this example the frame of the machine 710, that has a first coordinate system. The second machine 720 has a body 722, in this example the outer shell of the machine 720, that has a second coordinate system. The machines 710, 720 each have a plurality of target items 714, 724, respectively, fixedly coupled to the respective bodies 712, 722. The 3D locations of the target items 714 are known in the first coordinate system while the 3D locations of the target items 724 are known in the second coordinate system. In certain embodiments, these 3D locations of the target items 714, 724 are contained in one or more memories coupled to the machines 710, 720. In certain embodiments, a single memory contains information about both sets of target items 714, 724.

The mobile robotic system 730 is equipped with a body in the form of a moveable cart 740, a camera module 742, and a robotic arm 750 having an end-effector 752. In certain embodiments, there is an articulated joint (not visible in FIG. 7) between the camera module 742 and the cart 740, where the instantaneous angle and position of the camera module 742 with respect to a coordinate system of the cart 740 are measured and known. In certain embodiments, there is a memory (not visible in FIG. 7) coupled to the cart 740 that contains information about the angle and position of the camera module 742 with respect to a coordinate system of the cart 740. In certain embodiments, the camera module 742 has a coordinate system and the information in the memory comprises the position and angle of the coordinate system of the camera module in the coordinate system of the body. In certain embodiments, there is a memory (not visible in FIG. 7) coupled to the cart 740 that contains information about the angle and position of the camera module 742 with respect to a coordinate system of the cart 740.

The machine 710 has an interaction point 716 from which the part is to removed by the mobile robotic system 730. The 3D position of interaction point 716 in the first coordinate system of the first machine 710 is known. In certain embodiments, other details of how the end-effector 752 is to interact with the interaction point 716, such as an angle of approach, the attitude of the end-effect, and the point of contact with the part to be removed, are known.

In operation, the mobile robotic system 730 will travel to machine 710 and position itself such that the end effector 752 can reach the interaction point 716. In certain embodiments, the cart 740 may perform dead-reckoning tracking of its motion so that it can move to a preliminary position proximate to the machine 710 and the camera module 742 can then observe the target items 714 to determine the relative position of the mobile robotic system 730 to the machine 710. In certain embodiments, the cart 740 may move on rails or other travel guides (not shown in FIG. 7) to an identified position along the guide as a coarse positioning step then observe the target items 714 to determine the precise relative position.

In certain embodiments, the target items 714 are active fiducials and the machine 710 provides information to an external device, such as the mobile robotic system 730, through the fiducials 714 by modulating one of the frequency, pulse width, pulse timing, amplitude, or other attribute of the emitted light. This method of information transmission can be used by any device having a controllable light source, such as a fiducial, or another light-emitting element. An advantage of this method of data transmission is that the light is emitted over a large solid angle, even omnidirectionally, such that emitting device, in this case the machine 710, does not need to know where the optical receiver of the external device, in this case the mobile robotic system 730, is located. Communication can be from a mobile device to a fixed device or from a fixed device to a mobile device or bidirectional if both devices have an active fiducial or other light-emitting element. The external device may observe the emitting device using an imaging camera or a simple power-sensing detector (PSD) that is adapted to extract the modulated signal from the ambient light. In certain embodiments, the information comprises the 3D positions of the plurality of target items within the coordinate system of the emitting device. In certain embodiments, the emitting device is configured to receive commands from the external device and, in response to the commands, manipulate one or more of the fiducials, for example modifying the pulse width modulation (PWM) rate of one of the fiducials.

In certain embodiments, the workcell is an airport service area where the robotic system 730 is implemented as a robot forklift to pick up cargo from a holding location or delivery vehicle, for example a freight truck, and load the cargo into an airplane that is furnished with target markers and the cargo door opening and floor and the target markers are defined in a coordinate system of the airplane. In certain embodiments, the article received in the workcell 700 is a pallet having target markers that are defined in relation to the shape and size of the pallet. The information about the target markers in the coordinate system of various models of pallets may be stored in a central database or a memory of a forklift, and the pallet may have a barcode printed on it that identifies the model of the pallet so that the identifier extracted from the barcode can be used to retrieve the information about the pallet and target markers from the memory.

In certain embodiments, one or more fiducials 714 is uniquely identified by modulating the emitted light using PWM, pulse amplitude modulation (PAM), and/or frequency modulation (FM) to communicate one of an identifier, a location, or a 3D position. This may be done synchronously or asynchronously with the frame rate of the observing camera.

Figure 8:
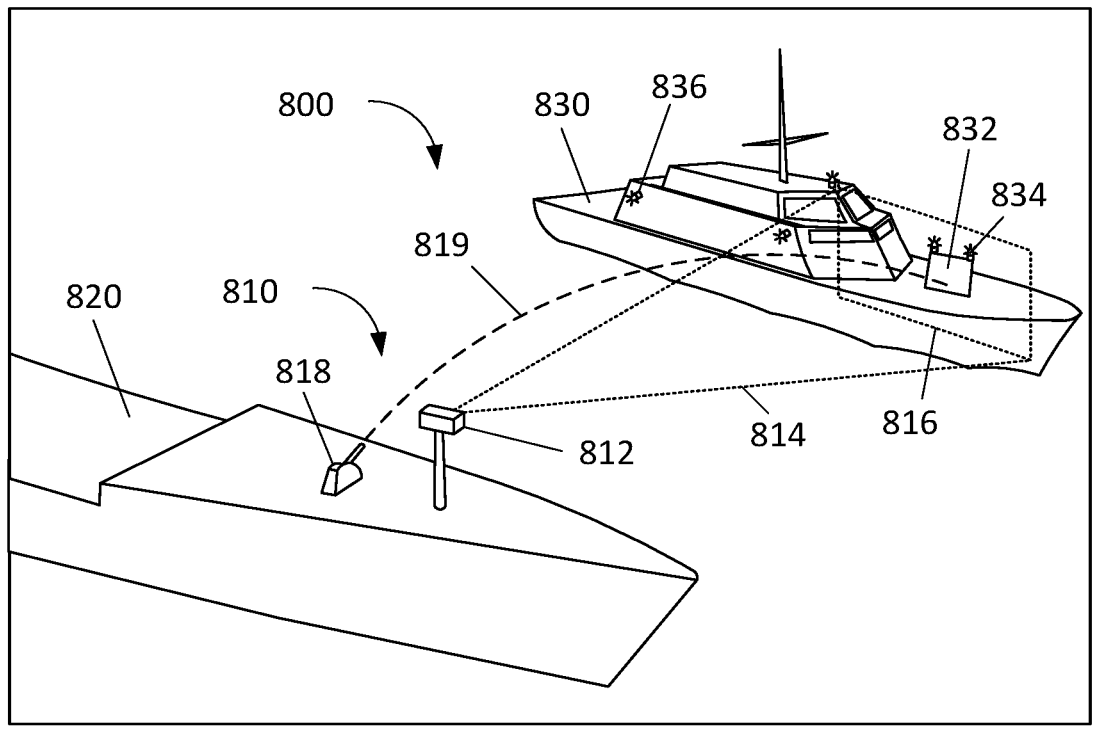
FIG. 8 depicts an exemplary virtual workcell at sea according to certain aspects of the present disclosure.

FIG. 8 depicts an exemplary virtual workcell 800 at sea according to certain aspects of the present disclosure. In this example, the workcell 800 encompasses a portion of ships 820 and 830 and the robotic system 810 is implemented as a camera module 812 and a cannon 818 that fires a slug (not shown in FIG. 8) along trajectory 819, wherein the slug is attached to a line that will be used to establish a "high line" between ships 820 and 830 that can be used to transfer people or supplies between the ships 820, 830 while the ships 820, 830 are moving in open water.

The receiving ship 830 has a receiving screen 832 configured to capture the slug and there are target items 834 attached to the receiving screen 832. The origination ship 720 has a camera module 812 with a field of view 814 that is sufficiently large at the distance of the receiving screen 832, as indicated by the frame 816, to observe the target items 834 while the ships are moving. The camera module 812 is coupled to a processor (not visible in FIG. 8) that processes the continuously changing positions of the target items 834 on the detectors of the camera system 812 and, using information about the position and orientation of the camera module 812 with respect to a coordinate system of the cannon 818, provides a position and orientation of the receiving screen 832 in the coordinate system of the cannon 818. In certain embodiments, the processor is configured to model the motion of the receiving screen 832 in the coordinate system of the cannon 818 and predict future relative positions and orientations of the receiving screen 832 in the coordinate system of the cannon 818, thereby permitting the cannon to be aimed and fired to have the slug reach the receiving screen despite movement of both the origination shop 820 and the receiving ship 830. In certain embodiments, the system uses target items 836 positioned at other locations on the receiving ship 830 and the field of view 814 encompasses the locations of the target items 836.

Figure 9:
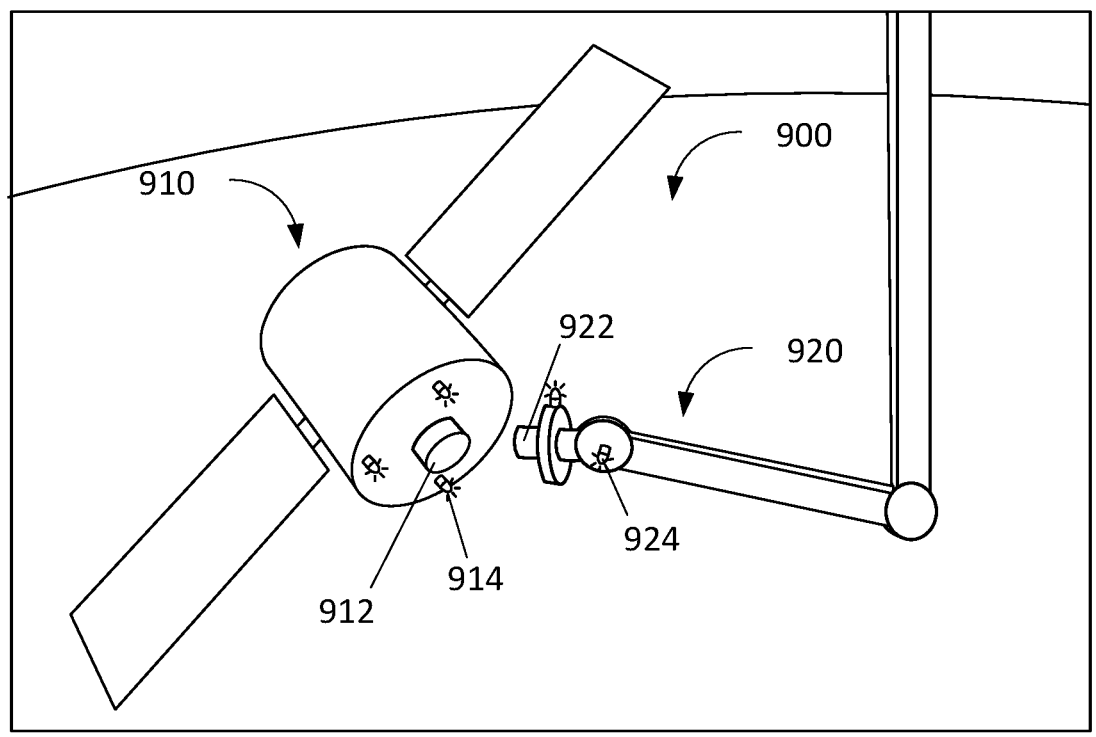
FIG. 9 depicts an exemplary virtual workcell in space according to certain aspects of the present disclosure.

FIG. 9 depicts an exemplary virtual workcell 900 in space according to certain aspects of the present disclosure. In this example, the workcell 900 encompasses a volume of space surrounding a robotic arm 920, wherein the robotic arm 920 is attached to a vehicle (not shown in FIG. 9) that is maneuvered into proximity of a satellite 910, thereby placing the satellite 910 within the workcell 900. The end effector 922 includes an optical system (not visible in FIG. 9) configured to observe the fiducials 914 and, using information regarding the position of the fiducials 914 and the coupler 912 as defined within a coordinate system of the satellite 910, determine the relative position of the coupler 912 to the end effector 922. This information can then be used to move the robotic arm 920 and the end effector 922 so as to allow the end effector 922 to contact and capture the coupler 912. In other embodiments, the end effector 922 is configured to interact with the satellite 910, for example to replace a component or adjust an item on the spacecraft 910.

In certain embodiments, there is a second camera system (not shown in FIG. 9) that is coupled to the vehicle and has a field of view that encompasses both the satellite 910 and the end effector 922, essentially the view as pictured in FIG. 9. The end effector 922 has fiducials 924 that allow the second camera system, or a processor coupled to it, to determine the positions and orientations of both the satellite 910 and the end effector 922 in a coordinate system of the second camera system. The knowledge of the positions and orientations of the satellite 910 and the end effector 922 can be used to perform closed-loop guidance of the movement of the end effector 922 to contact the coupler 912.

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order and are not meant to be limited to the specific order or hierarchy presented. Thus, the claims are not intended to be limited to the aspects shown herein but are to be accorded the full scope consistent with the language claims.

Headings and subheadings, if any, are used for convenience only and do not limit the invention.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the terms "a set" and "some" refer to one or more.

Terms such as "top," "bottom," "upper," "lower," "left," "right," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference without limiting their orientation in other frames of reference.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other configurations, such as curved or tapered for example, in some embodiments.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "operation for."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such as an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A workcell for interacting with a device to which are coupled a target item and a first memory comprising information about a three-dimensional (3D) position of the target item defined in a first coordinate system of the device, the workcell comprising:
   a camera module comprising:
      a second coordinate system,
      a first sensor that is configured to provide information about a first position of a first image of the target item on the first sensor, and
      a second sensor that is configured to provide information about a second position of a second image of the target item on the second sensor; and
   a processor communicatively coupled to the camera module and to the first memory and configured to:
      receive from the first memory information comprising the 3D position of the target item in the first coordinate system,
      receive from the camera module information about the first positions and the second positions of the image of the target item from the first and second sensors, respectively, and
      determine a position and an orientation of the first coordinate system in the second coordinate system; and
   a mobile cart movably coupled to the camera module and communicatively coupled to the processor and comprising a third coordinate system, the mobile cart configured to provide information to the processor about a position and an orientation of the camera module with respect to the third coordinate system;
   wherein the processor is further configured to receive the information from the mobile cart about the position and the orientation of the camera module with respect to the third coordinate system and determine a position and an orientation of the first coordinate system within the third coordinate system.

2. The workcell of claim 1, wherein:
   the camera module comprises a first optical system that includes the first sensor and a second optical system that includes the second sensor,
   the workcell further comprises a second memory comprising information about an arrangement of the first and second optical systems in the second coordinate system, and
   the second memory is communicatively coupled to the processor and the processor is further configured to retrieve a portion of the information about an arrangement of the first and second optical systems in the second coordinate system from the second memory.

3. The workcell of claim 1, wherein the first memory is remote from the
   device and the processor is configured to:
   receive an identifier from the device; and
   retrieve a portion of the information about the target item coupled to the device from the remote first memory using the identifier.

4. The workcell of claim 1, wherein the mobile cart comprises a robot
   forklift and the device comprises a pallet.

5. The workcell of claim 1, wherein the mobile cart comprises a drone
   carrying a package to be delivered, the workcell comprises a landing platform for a
   drone, the device comprises a compartment having an interaction point into which the
   package is to be placed.

6. The workcell of claim 1, wherein the mobile cart comprises a first
   ship and the device comprises a receiving screen of a second ship.

7. The workcell of claim 1, wherein the mobile cart comprises a space
   vehicle and the device comprises a satellite.

* * * * *